H. TURNER.
TOOL HOLDER.
APPLICATION FILED JUNE 20, 1912.

1,103,164.

Patented July 14, 1914.
2 SHEETS—SHEET 1.

Witnesses:
J. C. Devrik.
C. Carl Parker.

Inventor:
Harry Turner.
By Luther L. Miller
Atty.

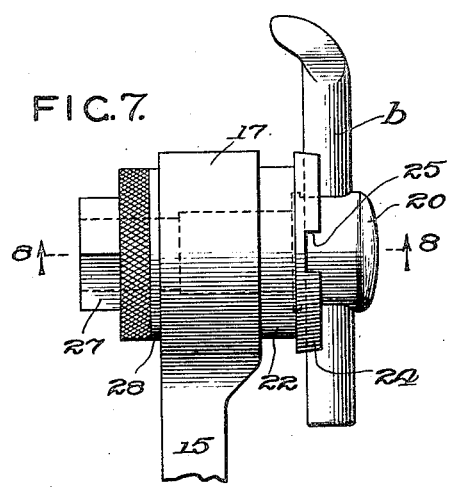
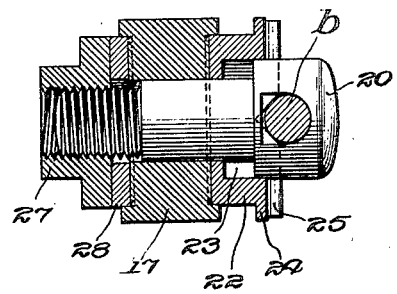
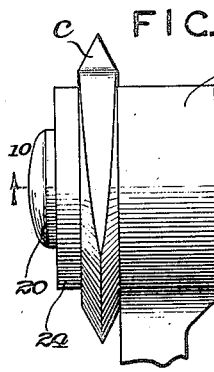
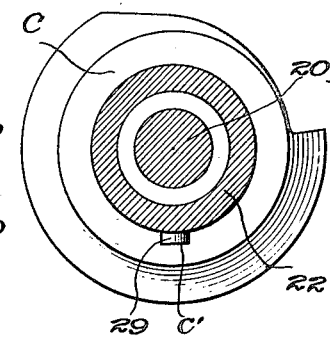
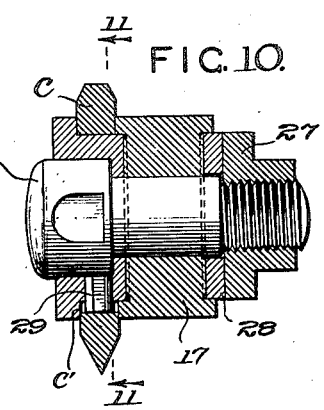
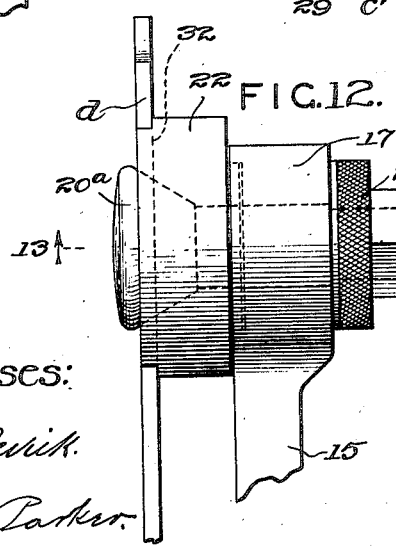
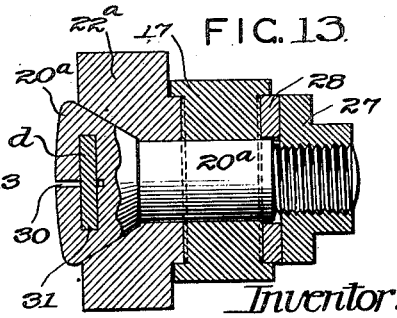

UNITED STATES PATENT OFFICE.

HARRY TURNER, OF CHICAGO, ILLINOIS, ASSIGNOR TO ARMSTRONG BROS. TOOL COMPANY, OF CHICAGO, ILLINOIS, A CORPORATION OF ILLINOIS.

TOOL-HOLDER.

1,103,164.  Specification of Letters Patent.  Patented July 14, 1914.

Application filed June 20, 1912. Serial No. 704,742.

*To all whom it may concern:*

Be it known that I, HARRY TURNER, a citizen of the United States, residing at Chicago, in the county of Cook and State of Illinois, have invented certain new and useful Improvements in Tool-Holders, of which the following is a specification.

This invention relates to tool holders adapted to be mounted on lathes and other machine tools, and the object of the invention, generally speaking, is to provide a tool holder which is adapted to support a great variety of tools of different shapes.

More specifically, the invention contemplates a tool holder comprising a supporting member and a plurality of devices arranged to be interchangeably mounted on said supporting member, each of said devices being adapted for supporting one or more tools.

The invention also relates to the peculiar construction of the supporting member of the holder, whereby the tool-engaging devices may be easily and securely clamped or fixed on said supporting member.

A further object of the invention is to provide a tool holder of the character above set forth which shall be of strong and durable construction and comprise the fewest possible parts.

The invention also relates to the other features of construction to be specifically pointed out in the following description.

Figure 1:
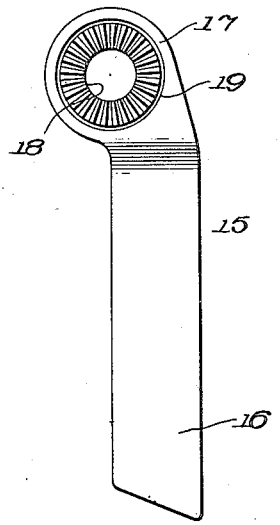
Figure 2:
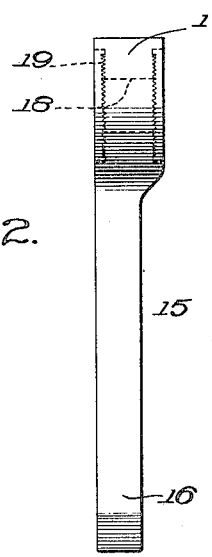
Figure 3:
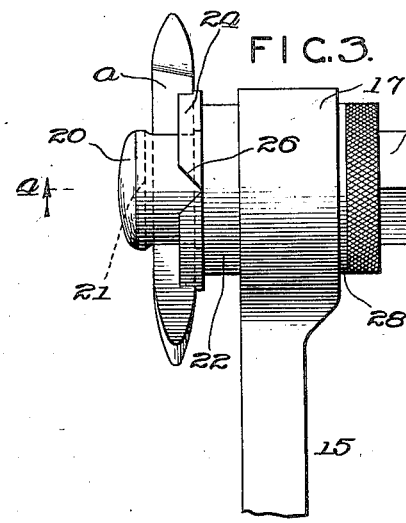
Figure 4:
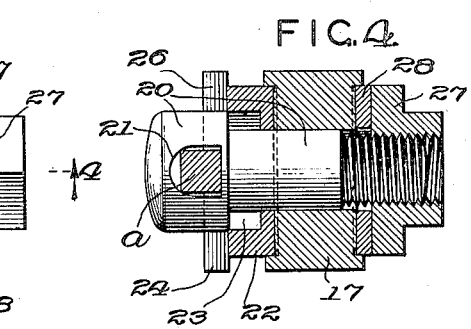
Figure 5:
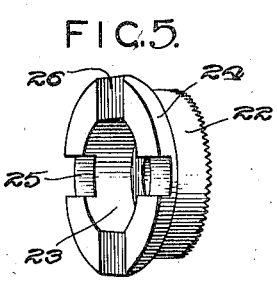
Figure 6:
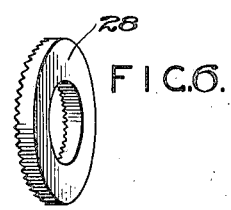

In the accompanying drawings, Figures 1 and 2 are respectively a side and an edge elevation of the supporting member of a tool holder embodying the features of my invention. Fig. 3 is an elevation showing the devices used for supporting one form of lathe tool. Fig. 4 is a section on line 4 4 of Fig. 3. Figs. 5 and 6 are perspective views of a collar and a washer respectively which lie at opposite sides of the head of the supporting member. Fig. 7 is an elevation of the same parts as shown in Figs. 3 and 4, but showing a different arrangement of said parts for supporting a boring tool. Fig. 8 is a section on line 8 8 of Fig. 7. Fig. 9 is an elevation illustrating the manner of mounting a thread-cutting tool. Fig. 10 is a section on line 10 10 of Fig. 9. Fig. 11 is a section on line 11 11 of Fig. 10 and showing a thread-cutting tool in side elevation. Fig. 12 is an elevational view illustrating a slightly modified construction adapted for supporting a cutting-off tool. Fig. 13 is a section on line 13 13 of Fig. 12.

While I have herein shown alternative constructions of my invention adapted for supporting several different shapes of tools, I would have it understood that the invention is not limited to the constructions herein shown and described, but may be modified to conform to other shapes of tools than those herein shown while retaining the generic characteristics of the invention and without departing from its spirit or scope.

In the embodiment of my invention which I have shown in the drawings, the supporting member 15 of the tool holder comprises a shank portion 16 arranged to be secured in the tool post of the lathe and a circular head portion 17 on one end of said shank. Said head portion has an opening 18 passing centrally therethrough from side to side, and each side of the head has a recess 19 surrounding the opening 18. The bottoms of these recesses are roughened or serrated to prevent slippage of the parts which engage with the head. The tools are secured to the supporting member by means of a bolt 20 extending through and fitting in the opening 18 in the head 17 of said supporting member, the enlarged head of said bolt having a transverse opening 21 therethrough through which opening a lathe tool *a* may be inserted. Between the head of the bolt and the adjacent side of the head of the supporting member is a collar 22 fitting upon the bolt 20 and having a countersink 23 in its outer face arranged to receive the head of the bolt. Upon the outer end of the collar 22 is an annular flange 24 having two pairs of diametrically opposite notches 25 and 26 therein. The notches 25, as will be seen from Fig. 5, are rectangular while the notches 26 are of V-shape. When the lathe tool *a*, shown in Figs. 3 and 4, is to be used in the tool holder, said tool is inserted in the opening in the head of the bolt 20 and the collar 22 is adjusted on the bolt so that the tool *a* fits in the rectangular notches 25. The end of the bolt 20 opposite to the head thereof is threaded to receive a nut 27, and between this nut and the adjacent side of the head 17 of the supporting member is a washer 28. The inner faces of the collar 22 and the washer 28 are roughened or serrated, as plainly shown in Figs. 5 and 6, to engage with the serrated bottoms of the recesses 19 in the head 17. Thus when the nut 27 is tightened up on the bolt the tool *a* will be firmly clamped in place on the supporting member and rotation of the tool will be effectually prevented by the serrated surfaces.

When a boring tool *b*, shown in Figs. 7 and 8, is to be used, the tool is inserted through the opening 21 in the bolt head, and the collar 22 adjusted so that said tool lies in the V-shape notches 26. The nut 27 is then tightened up to clamp the tool in place as above described.

The thread-cutting tool *c*, illustrated in Figs. 9, 10 and 11, is fitted upon the periphery of the collar 22 between the flange 24 thereon and the adjacent face of the head 17 of the supporting member, the collar being made in the proper dimension, so that said thread-cutting tool fits between these parts and permits the serrated surfaces on the collar and the supporting head to properly interengage. In order to prevent rotation of the cutting tool upon the collar, the latter is provided with a lug or projection 29 arranged to fit in a notch *c'* in the inner periphery of the cutting tool. When the nut 27 is turned up, the cutting tool will be securely fixed in place.

The construction illustrated in Figs. 12 and 13 is somewhat modified to accommodate a cutting-off tool *d*, which is in the form of a flat bar. The head of the bolt 20ª has a slot 30 extending transversely and centrally thereof and parallel with the axis of the bolt. Said head also has another slot 31 therein at right angles with the slot 30 adapted to receive the tool *d*. The collar 22ª has grooves 32 in its outer face in which the tool *d* fits. The inner side of the head of the bolt 20ª is made conical to fit in a conical recess in the collar 22ª. As will be seen, turning of the nut 27 will draw the head of the bolt inwardly and firmly bind the tool *d* in the slot 31 and the groove 32.

I do not limit my invention to the specific construction herein disclosed, but aim to cover all modifications within the scope of the appended claims.

I claim as my invention:

1. In a tool holder, the combination of an attaching shank having a head thereon, the latter having an opening extending therethrough from side to side and having countersunk recesses in its opposite sides immediately surrounding said opening, the bottoms of said recesses being serrated, a bolt passing through said opening and provided with an enlarged head having a transverse opening therethrough, a collar fitting on said bolt between the head thereof and the head of the attaching shank, the collar having a relatively deep recess in its outer face in which the head of said bolt fits snugly, and the said collar having a plurality of pairs of diametrically opposed notches of different shapes in its outer face, to coöperate with the opening through the bolt head in holding differently shaped tools, the inner end of said collar being adapted to fit snugly in the recess in the shank head, and being serrated to coöperate with the serrations in that recess, a washer surrounding the opposite end of said bolt and adapted to fit snugly in the shank head recess and having serrations to coöperate therewith, and a nut threaded on the last mentioned end of the bolt and turned tightly against said washer.

2. In a tool holder, in combination, an attaching shank provided with a head having an opening therethrough, a bolt passing through said opening, a collar fitting on said bolt, and held between the head of the bolt and said shank head, said collar being of smaller exterior diameter than the shank head, and being provided with an outstanding flange adjacent to its outer face, said shank head and said flange providing an annular groove adapted to receive an annular thread-cutting tool, and a nut threaded on the opposite end of said bolt for clamping the parts together.

In testimony whereof I have hereunto affixed my signature in the presence of two witnesses.

HARRY TURNER.

Witnesses:
 EARL C. CARLSON,
 GEORGE L. CHINDAHL.